United States Patent
Duggal et al.

(10) Patent No.: US 10,275,791 B2
(45) Date of Patent: Apr. 30, 2019

(54) SYSTEMS AND TECHNIQUES FOR CONFIGURING AN ELECTRONIC COMMUNICATION BASED ON IDENTIFIED PREFERRED CHANNELS OF SHARING

(71) Applicants: Adobe Systems Incorporated, San Jose, CA (US); Neolane SAS, Arcueil (FR)

(72) Inventors: Ashish Duggal, New Delhi (IN); Anmol Dhawan, Ghaziabad (IN); Sachin Soni, New Delhi (IN); Stéphane Moreau, L'Hay les Roses (FR)

(73) Assignees: Adobe Inc., San Jose, CA (US); Neolane SAS, Arcueil (FR)

(*) Notice: Subject to any disclaimer, the term of this patent is extended or adjusted under 35 U.S.C. 154(b) by 529 days.

(21) Appl. No.: 14/600,591

(22) Filed: Jan. 20, 2015

(65) Prior Publication Data

US 2016/0210662 A1   Jul. 21, 2016

(51) Int. Cl.
G06Q 30/00 (2012.01)
G06Q 30/02 (2012.01)

(52) U.S. Cl.
CPC .................. *G06Q 30/0251* (2013.01)

(58) Field of Classification Search
CPC .................................................. G06Q 30/0251
See application file for complete search history.

(56) References Cited

U.S. PATENT DOCUMENTS

| | | | |
|---|---|---|---|
| 2007/0192121 A1* | 8/2007 | Routson | G06Q 50/265 705/1.1 |
| 2010/0010866 A1* | 1/2010 | Bal | G06Q 30/02 705/14.66 |
| 2010/0030648 A1* | 2/2010 | Manolescu | G06Q 10/0637 705/14.66 |

(Continued)

OTHER PUBLICATIONS

Kietzmann et al., "Social media? Get serious! Understanding the functional building blocks of social media", Business Horizons 54:3 (Jun. 2011), pp. 241-251, published by the Kelley School of Business, Indiana University (Year: 2011).*

*Primary Examiner* — Kambiz Abdi
*Assistant Examiner* — Scott C Anderson
(74) *Attorney, Agent, or Firm* — Kilpatrick Townsend & Stockton LLP

(57) ABSTRACT

Systems and methods configure a set of sharing options in an electronic communication to be sent to recipients based on the recipients' sharing preferences. The sharing preferences may be generally applicable to all categories of content or may be specific to one or more specific categories of content. One embodiment involves identifying a category of content, identifying a sharing preference of a particular recipient for sharing that category of content, configuring a set of sharing options based on that sharing preference, and sending the sharing-preference targeted communication with the content to the recipient. The recipient receiving the communication and seeing his or her preferred sharing option available may use that option and share the content of the communication with others enhancing the distribution of the content. The (Continued)

recipient's most preferred sharing option may be more prominently displayed than others to further encourage sharing of the content by the recipient.

19 Claims, 10 Drawing Sheets

(56) References Cited

U.S. PATENT DOCUMENTS

| | | | |
|---|---|---|---|
| 2010/0088177 A1* | 4/2010 | Lu | G06Q 30/02 |
| | | | 705/14.43 |
| 2010/0162118 A1 | 6/2010 | Kim | |
| 2012/0136941 A1* | 5/2012 | Howes | H04L 51/14 |
| | | | 709/206 |
| 2013/0268508 A1* | 10/2013 | Bracher | G06F 17/30864 |
| | | | 707/709 |
| 2014/0040712 A1* | 2/2014 | Chang | G06F 17/212 |
| | | | 715/202 |
| 2015/0235672 A1 | 8/2015 | Cudak | |
| 2016/0034159 A1 | 2/2016 | Vranjes et al. | |
| 2016/0062635 A1 | 3/2016 | Feit | |
| 2016/0179454 A1 | 6/2016 | Liu | |

* cited by examiner

SYSTEMS AND TECHNIQUES FOR CONFIGURING AN ELECTRONIC COMMUNICATION BASED ON IDENTIFIED PREFERRED CHANNELS OF SHARING

TECHNICAL FIELD

This disclosure relates generally to computer-implemented methods and systems and more particularly relates to configuring electronic communications.

BACKGROUND

Distributors of electronic content often create several versions of an electronic communication, such as an email, and generally want to find out which version will have the biggest impact on a targeted population. For example, a marketer can transmit communication related to a marketing campaign via a variety of communication channels, such as e-mail, mobile text message, or a social media platform. Recipients of the marketing communication can indicate preferred channels for receiving communications, and the marketer can transmit the marketing content to the recipients using the preferred channels. For example, one recipient can indicate a preference to receive marketing communications via e-mail and a second recipient can indicate a preference to receive marketing communications via a specific social media platform.

The impact of the marketing campaign, however, can depend on how many recipients of the marketing communication share the marketing communication with their contacts. Once the marketing communication is received, recipients can share the received marketing communication to additional parties via a similar variety of channels (e.g., e-mail contacts. Once the marketing communication is received, recipients can share the received marketing communication to additional parties via a similar variety of channels (e.g., e-mail or a social media platform). In some instances, a recipient may specify a preferred channel of communication, but then in practice share received content using a different channel of communication. Recipients tend to share content less often or not at all if the marketing communication does not include and prominently display the given recipient's preferred sharing option and, as a result the overall impact of the marketing campaign is often less than it could be.

SUMMARY

Systems and methods disclosed herein identify preferred sharing options for recipients of a marketing communication and configure a set of sharing options in the marketing communication to be sent to those recipients based on the recipients' preferred sharing options. The sharing preferences may be generally applicable to all categories or may be specific to one or more specific categories associated with the marketing communication content. One embodiment involves identifying a category of a marketing campaign and identifying a sharing preference of a particular recipient to share communications associated with the category using a particular channel of sharing. The embodiment configures a set of sharing options based on that sharing preference and sends the sharing-preference targeted marketing communication to the recipient, the communication including a marketing message and the set of sharing options. The recipient receiving the marketing communication and seeing his or her preferred sharing option available may exercise that option and share the content of the marketing communication with others, enhancing the effectiveness of the marketing communication. The recipient most preferred sharing option may be more prominently displayed than other sharing options or otherwise emphasized to further encourage sharing of the content by the recipient.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
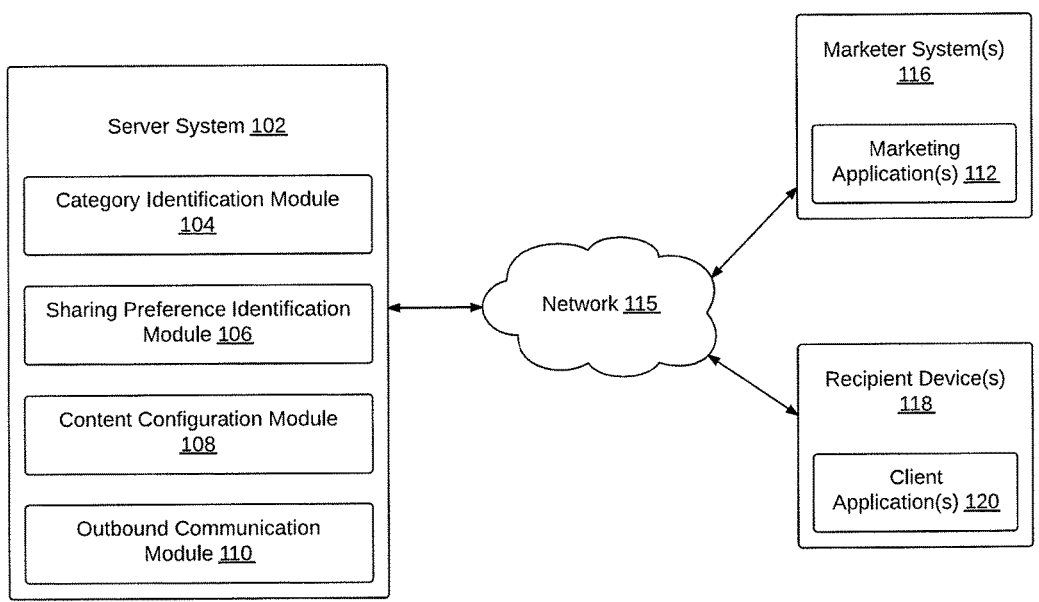
FIG. 1 is a block diagram depicting an example of a system for configuring and sending marketing communications with custom sharing options for intended recipients.

Computer-implemented systems and methods are disclosed for identifying sharing preferences of intended recipients of a marketing communication and configuring the marketing communication based on the sharing preferences. E-mails and other electronic communications providing electronic content often include multiple options for recipients to electronically and instantly share the content with others. For example, a recipient of the electronic communication may receive an e-mail with an advertisement offering a sale on a television. The advertisement may include a list of sharing options, such as sharing via email, sharing via a first social media network, sharing via a second social media network, and sharing via other communication channels. Techniques for sending marketing communications with sharing options are disclosed that customize the sharing options to present the sharing options that are best suited for each recipient based on identifying the sharing preferences of individual recipients. The sharing preferences of each of the recipients are identified based on the interactions of each recipient with prior marketing communications.

While existing techniques for sending marketing communications with sharing options enable near instantaneous sharing of such content and the use of electronic networks can greatly enhance the distribution and targeting of a marketing campaign, the electronic nature of sharing such communications creates hurdles unique to the electronic network environment in which they are used. Electronic communications have previously been sent to all recipients with a consistent, limited set of sharing options even though many different sharing options are possible. As the number of sharing options continues to grow and change as new technologies are developed and released. It becomes more and more difficult to provide communications with sharing options that will be selected rather than overlooked by the recipients. This problem is complicated by the fact that individual recipients often have specific sharing preferences for sharing the content in received electronic communications and thus presenting only a limited set of sharing options risks excluding a given user's preferred sharing option(s). For example, some recipients may prefer sharing via a first social network more than sharing via a second social network. A particular recipient may not share received content that he or she otherwise would if the marketing communication content does not include or readily display the recipient's preferred sharing option in the electronic communication. Moreover, the recipient's sharing preferences can be specific to the nature of the content. For example, a recipient may prefer to share sports related content using the second social network and technology related content using the first social network.

Existing systems used to distribute electronic communications with options for sharing electronic content do not adequately facilitate the sharing of the electronic content for at least these reasons. Embodiments disclosed herein provide systems and methods used in conjunction with the distribution of electronic communications with options for sharing electronic content that better address the issues of the otherwise intractable number of sharing options available on electronic networks and the variability in user preferences for using such sharing options. The interactions of a recipient with prior marketing communications are tracked to determine whether the recipient has particular sharing preferences when interacting with marketing communications. These preferences are then used to customize a new marketing communication to that recipient to include, exclude, emphasize, deemphasize or otherwise customize the sharing preferences. For example, if it is determined that a particular recipient most commonly shares content on a particular social media network, an icon for sharing via that social media network may be prominently displayed, e.g., displayed before other sharing options and/or emphasized more than other sharing options, in the marketing communication.

The customization of sharing options can be further improved by taking into account the fact that a given recipient's sharing preferences often vary depending upon the category of the content. Content can be categorized in various ways and using various levels of granularity. Examples of broad categories include, but are not limited to, Education, Fashion, Home Improvement, Automotive, etc. Category-specific sharing preference information is compiled by tracking how a recipient interacts with marketing communications of different categories. This involves tracking whether the marketing communication is shared and/or what channel of communication is used to share the communication. For example, one recipient may tend to share marketing communications pertaining to education via e-mail but may tend to share marketing communications pertaining to fashion via a particular social network. Based on the interactions of a recipient on prior marketing communications of a given category, the computer-implemented system can identify whether the recipient of a marketing communication has a sharing preference when interacting with the given category of the marketing communication.

In one embodiment, when communicating a marketing communication of a given category, the computer-implemented system can divide intended recipients of the marketing communication based on their preferred channel for receiving the communication. For each preferred channel of receiving communications, the system can further divide the recipients into multiple sub-groups, each sub-group pertaining to the preferred channel for sharing that category of the marketing communication. For example, considering an exemplary use case of communicating marketing content that falls under the "education" category, the computer-implemented system can determine that a certain number of recipients prefer to receive educational marketing content via e-mail. For example, the system can determine that 5,000 recipients prefer to receive educational content via e-mail. The computer-implemented system can further divide the recipients based on their channels of preference for sharing the educational content. For example, the system can determine that 2,000 of the 5,000 recipients tend to share educational content via a first social network, 1,500 of the 5,000 recipients tend to share educational content via a second social network, 500 of the 5,000 recipients tend to share educational content via a third social network, and 1,000 of the 5,000 recipients typically do not share marketing related content. In an additional embodiment, the system can further divide the recipients based on a second most or a third most preferred channel for sharing for the given category/type of campaign.

A marketer is able to design a marketing campaign such that the sharing options included in each communication of the campaign are customized for different subgroups. The recipients in a given subgroup who share the same sharing preferences will receive a version of the marketing communication that is customized according to those sharing preferences. Recipients in the subgroup who prefer to share via e-mail, for example, may receive a communication with a share via e-mail option more prominently displayed than the option.

In another embodiment, a marketer can take into account selections of or other measures of engagement or interest generated by a recipient's shared posts for a given category/type of campaign when designing the marketing campaign. For example, when a recipient of a marketing communication shares the content on a social network, the computer-implemented system can track how many times the shared content is selected/accessed by final recipients via the social network. When configuring the sharing options of subsequent marketing communications, the computer-implemented system can modify the display configuration of various sharing options based on the predicted engagement or interest that each sharing option is expected to receive.

Embodiments disclosed herein can improve the impact of a marketing campaign by increasing the likelihood that recipients of a marketing communication will share the marketing communication with their contacts in a variety of ways. Customizing the selection and display of sharing options may significantly improve the chances that a marketing communication will be shared and thus greatly increase the number of recipients exposed to the content of the marketing communication. Moreover, configuring marketing communication sharing options based on category of content can even more significantly improve the chances that the marketing communication will be shared by accounting for variability in each user's sharing preferences for different types of content.

These illustrative examples are given to introduce the reader to the general subject matter discussed here and are not intended to limit the scope of the disclosed concepts. The following sections describe various additional aspects and examples with reference to the drawings in which like numerals indicate like elements, directional descriptions are used to describe the illustrative examples but like the illustrative examples, should not be used to limit the present disclosure.

As used herein, the phrase "marketing campaign" refers to one or more coordinated activities associated with promoting or offering for sale one or more products or services. A marketing campaign can involve one or more e-mail or other communications to targeted recipients to promote or offer for sale the products or services of the campaign.

As used herein, the phrase "category" refers to a topic or theme with which a marketing campaign and its communications are associated. Examples of categories include but are not limited to: Fashion, Sports, Mobiles, Automotive, Education, Food, Health/and Real Estate. For example, a campaign of a particular series of cell phone may be categorized as a "Mobile" campaign. A campaign of clothing/apparel may be categorized as a "Fashion" campaign. Categories may be defined using other broader or narrower categorization schemes as may be appropriate for a particular implementation.

As used herein, the term "sharing" refers to forwarding, posting, providing, or otherwise making available content to one or more others. Examples of sharing include, but are not limited to, forwarding an e-mail, forwarding a link to a webpage, posting content via a social media network, and sending content via text messages.

As used herein, the phrase "sharing preference" refers to a person's tendency or inclination for one alternative for sharing over one or more other alternatives for sharing. A sharing preference may be determined based on prior sharing behavior of the person. For example, a computer may determine that a person has a preference sharing via a first social media network over sharing via a second social media network based on a person having a history of sharing via a first social media network twice as much as via a second social media network.

As used herein, the phrase "marketing communication" refers to any e-mail, text, posting, or other electronic communication providing content for a marketing campaign. Examples of marketing communications include, hut are not limited to, a special offer sent to a group of e-mail recipients, an advertisement presented on a web page, and a social media post announcing a new product release or advertising an existing product.

As used herein, the phrases "channel" and "channel, of sharing" refer to an electronic platform or medium for communicating content such as marketing communication. Examples of channels include but am not limited to: e-mailing, mobile text messaging, sharing or posting via social media platforms or instant messaging platforms.

Referring now to the drawings, FIG. 1 is a block diagram depicting an example of a system for configuring and sending marketing communications with custom sharing options for intended recipients. The system includes a server system 102, a marketer system(s) 116, and recipient device (s) 118 that interact with one another through network(s) (s) 115. In this example system, a marketer can use marketing system(s) 116 to initiate marketing communications for a marketing campaign using marketing application(s) 112. This may, for example, involve sending email advertisements to a group of recipients who access the email advertisements using client application(s) 120 at recipient device (s) 118.

The server system 102 can include features that facilitate identifying the category of the marketing communications as well as the sharing preferences of recipients using recipient device(s) 118. The server system 102 also has features that allow for configuring the marketing communication content to customize sharing options for the recipients and transmitting marketing communication to the recipient device(s) 118. These features, in alternative implementations, could be implemented on the marketer systems, on separate systems, or using any other computing environment that is appropriate for the particular circumstances and requirements being addressed.

In the example of FIG. 1, the server system 102 can include a category identification module 104, a sharing preference identification module 106, a content configuration module 108, and an outbound communication module 110. The category identification module 104 can identify a category of a marketing communication. For example, the category identification module 104 can be implemented as a software module that outputs the category of digital content provided as an input. Examples of the category identification module 104 include the Adobe SEDONA 3.0.5.3 application offered by Adobe Systems, Inc. of San Jose, Calif., the Semantria API offered by Semantria USA Amherst, Mass., or by any offer application or service capable of inferring categories from text or other content.

The sharing preference identification module 106 included in the server system 102 can identify if recipients prefer certain sharing options specific to the category identified by the category identification module 104. For example, the sharing preference identification module 106 can track, for each recipient receiving a marketing communication of a specified content, whether the marketing communication is shared and what channel of communication is used to share the marketing communication. The server system 102 can include a database in memory (not shown) that can store tracked sharing preferences of each recipient in respective customer profiles. For a subsequent marketing communication provided by the marketer system 116, the sharing preference identification module 106 can identify sharing preferences of each recipient by accessing the respective customer profiles for the recipients. If a recipient shares the subsequent marketing communication via a communication channel different from the communication channel tracked and stored in the customer profile, then the sharing preference identification module 106 can update the customer profile with the new sharing preference.

The content configuration module 108 can configure a set of sharing options for a recipient device 118. The set of sharing options can be configured based on the sharing preferences identified by the sharing preference identification module 106. The set of sharing options can include a list or grid of sharing options that are included in the content of the marketing communication. For example, the set of sharing options can include webpage hyperlinks or other interactive user interface elements to direct the recipient to different social network platforms, and an application link to open an e-mail client. In another example, the set of sharing options can be embedded within the marketing communication, such that the set of sharing options appear on the recipient user interface when the recipient selects a piece of text in the marketing communication. The content configuration module 108 can configure the set of sharing options such that the recipient's preferred sharing option is more visible relative to the other sharing options. For example, taking a case where the category identification module 104 determines that an exemplary marketing communication corresponds to an "automotive" category, the sharing preference identification module 106 can determine that a recipient typically shares automotive communications via a particular social network. The content configuration module 108 can modify a marketing communication that falls in the automotive category by configuring the set of sharing options in the marketing communication by placing a hyperlink to the preferred social network first in the set of sharing options. Alternatively, the content configuration module 108 can increase the size of a user interface icon representing the preferred social network relative to the other icons representing the other sharing options.

The outbound communication module 110 can transmit the marketing communication, including the modified set of sharing options, to the recipient device 118. In this example, the marketing communication sent to the recipient device 118 includes sharing options configured according to the recipient's identified sharing preferences. Sharing options for the same marketing message can thus be individually customized for the intended recipient.

Figure 2:
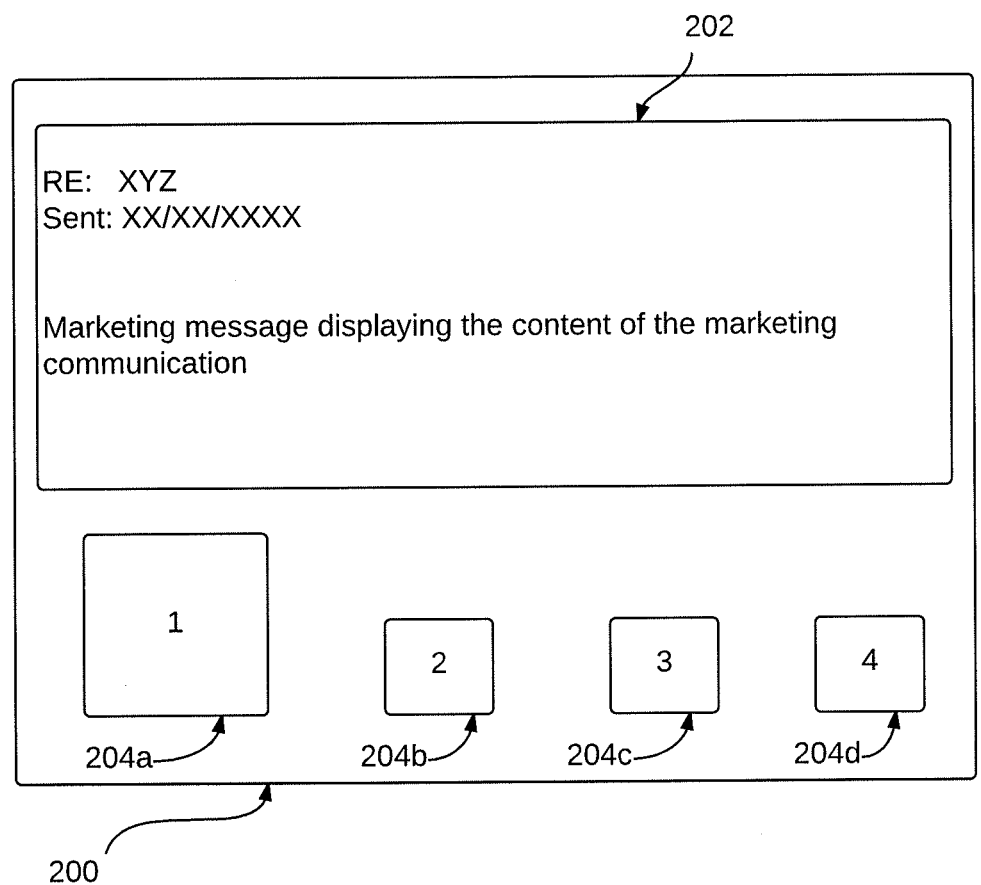
FIG. 2 is an example of a marketing communication with a customized set of sharing options.
Figure 3:
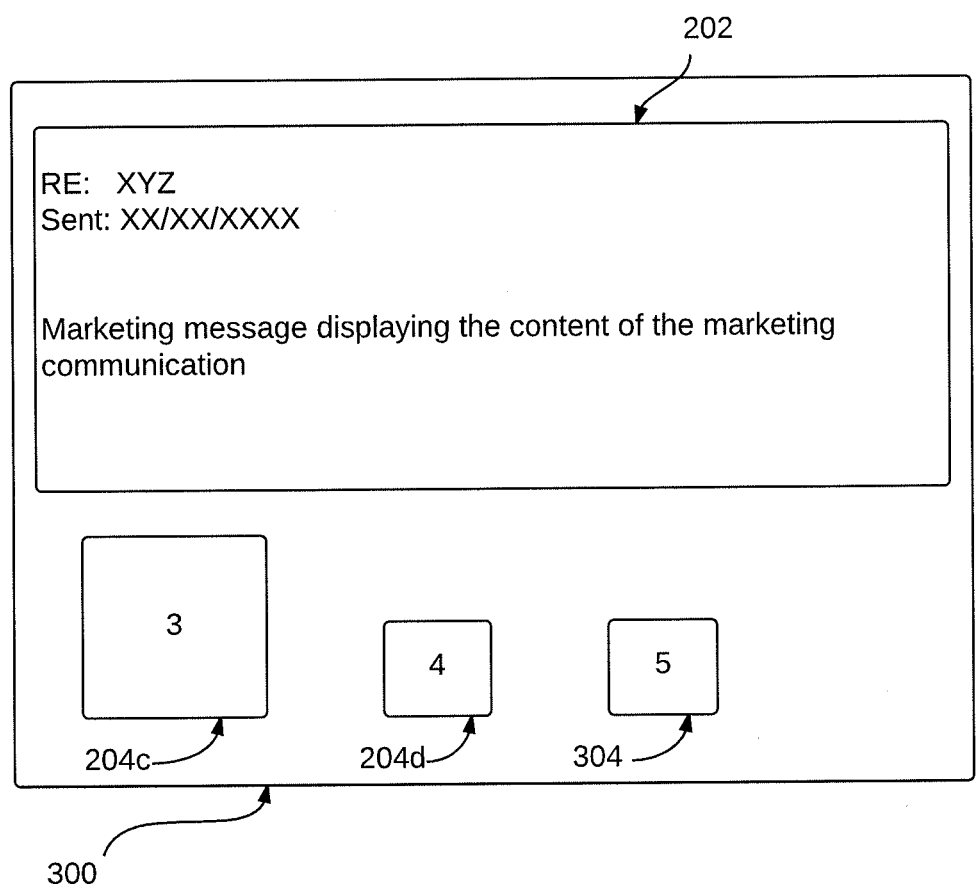
FIG. 3 is an example of a marketing communication with a customized set of sharing options, customized differently compared to the sharing options shown in FIG. 2.

FIGS. 2 and 3 depict example marketing communications that include sharing options customized according to a first recipient's and second recipient's identified sharing preferences, respectively. Non-limiting examples of customizing sharing options based on identified sharing preferences include emphasizing a preferred sharing option relative to the other sharing options, ordering the sharing options by preference, including preferred sharing options, or excluding less preferred sharing options.

FIG. 2 shows a customized marketing communication 200 that is transmitted from a server system 102 to a recipient device 118 after being customized by the content configuration module 108. The marketing communication 200 includes a marketing message 202 and a set of sharing options 204a-d. Each sharing option 204a-d can include a hyperlink or other selectable icon to forward the marketing message 202 via a respective channel of sharing. For example, sharing option 204a includes a hyperlink to forward the marketing message 202 via e-mail and sharing options 204b-d include hyperlinks to different social media platforms. The marketing message 202 displays the content of a given category for the marketing campaign. For example, the marketing message 202 can include an e-mail advertising a new automobile, and the category identification module 104 can identify the marketing communication 200 as pertaining to an "automotive" category. The marketing communication 200 is depicted as an e-mail message for illustrative purposes. Other types of marketing communication, however, are also possible as discussed above.

The sharing options 204a-d included in marketing communication 200 are customized according to the recipient's identified sharing preferences. For example, the sharing option 204a (e.g., the sharing option identified as the primary sharing preference) is presented to the recipient as an icon larger in size relative to sharing options 204b-d and presented first. Sharing options 204b-d are presented in an order according to the recipient's identified sharing preferences (e.g., as the recipient's secondary, tertiary, and quaternary sharing preferences, respectively).

Similarly, the server system 102 can customize a second marketing communication for a second recipient according to the second recipient's sharing preferences. FIG. 3 depicts a customized marketing communication 300, which includes the marketing message 202 and a second set of sharing options 204c-d, 304 intended for a second recipient. The second recipient's sharing preferences may differ from the first recipient's sharing preferences. Thus, the set of sharing options 204c-d, 304 in marketing communication 300 are customized differently than the set of sharing options 204a-d in marketing communication 200. For example, sharing option 204c (the second recipient's primary sharing preference) is presented to the second recipient as an icon larger relative to the other sharing options 204d, 304. The content customization module 108 also includes sharing option 304 as a choice in marketing communication 300, a sharing option that was not identified and not presented to the first recipient (the recipient of marketing communication 200).

In some aspects, recipients of a category-specific marketing communication can have a preferred channel of receiving communication as well as preferred shaving options. For an identified category of a marketing communication, the server system 102 can divide a target group of recipients based on the recipients' preferred channels of receiving communication and further sub-divide the recipients based on identified sharing preferences.

Figure 4:
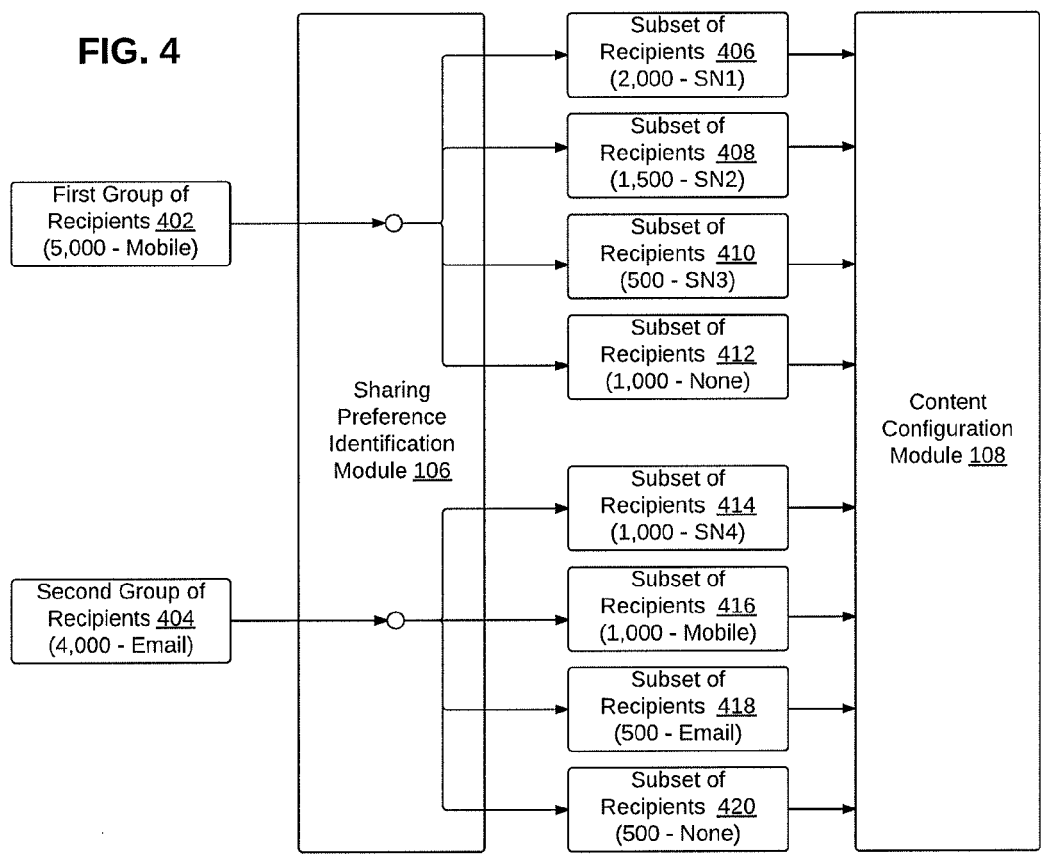
FIG. 4 is a block diagram depicting the division of a group of recipients based on preferred channels of communication and identified sharing preferences.

FIG. 4 is a block diagram depicting the division of a group of recipients based on preferred channels of communication and identified sharing preferences. Different recipients may choose to receive marketing communications of a given category on different communication channels. For a category-specific marketing communication, FIG. 4 shows a first group of recipients 402 and a second group of recipients 404. For example, for a marketing communication pertaining to an "education" category, the first group of recipients 402 (e.g., 5,000 recipients) may choose to receive the communication via mobile device and the second group of recipients 404 (e.g., 4,000 recipients.) may choose to receive the communication via email.

For each group of recipients 402, 404, the sharing preference identification module 106 can sub-divide the recipients based on identified sharing preferences for sharing the identified type of content. Continuing the example above, the sharing preference identification module 106 may determine that of the first group of recipients 402, a subset of recipients 406 prefer to share education related content via a first sharing preference (e.g., 2,000 of the 5,000 recipients may choose to share via a first social network (labeled "SN1" in FIG. 4)). Similarly, the sharing preference identification module 106 may determine that of the first group of recipients 402, a subset of recipients 408 prefer to share education related content via a second sharing preference (e.g., 1,500 of the 5,000 recipients may prefer to share education related content via a second social network (labeled "SN2" in FIG. 4)), and a subset of recipients 410 prefer to share education related content via a third sharing preference (e.g., 500 of the 5,000 recipients may prefer to share on a third social network (labeled "SN3" in FIG. 4)). The sharing preference identification module 106 can also determine a subset of recipients 412 that have no sharing preference (e.g., 1,000 of the 5,000 recipients do not typically share). Similarly, the sharing preference identification module 106 can divide the second group of recipients 404 into subsets of recipients 414, 416, 418, 420 based on identified sharing preferences.

The content configuration module 108 can configure sharing options for each recipient in the subsets of recipients 406-420 based on the identified sharing preferences information indicating the number of recipients that do not typically share the marketing communication can be provided to the marketer system 116, allowing the marketer to further customize the marketing communication in order to incentivize the recipients that do not typically share marketing content. For example, the marketer may configure sharing options such that all popular sharing options are prominently visible to recipients that do not typically share.

Figure 5:
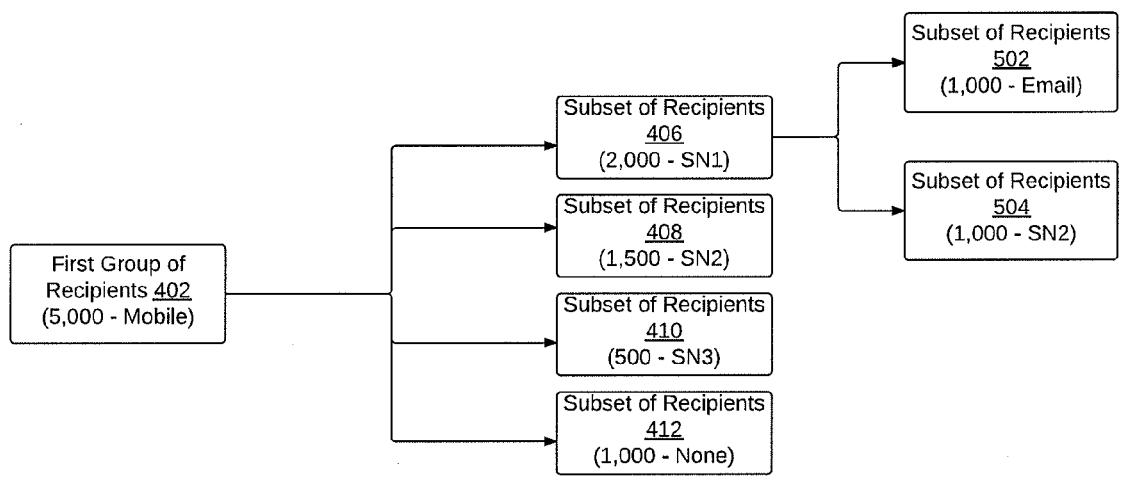
FIG. 5 is a block diagram depicting the division of a group of recipients from FIG. 4 based on primary and secondary sharing preferences.

In some embodiments, recipients of a marketing communication may have a primary sharing preference and a secondary sharing preference. The secondary sharing preference can indicate a recipient's second most preferred channel for sharing. FIG. 5 is a block diagram depicting the division of the group of recipients 402 based primary and secondary sharing preferences. The group of recipients 402 may be divided into subsets of recipients 406-412 based on primary sharing preferences as discussed above with respect to FIG. 4. For example, as discussed above, the group of recipients 402 may include 5,000 recipients targeted to receive an education related marketing communication. Of the 5,000 recipients a first set of recipients 406 may include 2,000 recipients that prefer to share education related communications via a first social network (labeled "SN1" in FIG. 5). The sharing preference identification module 106 can also further subdivide the subset of recipients 406 into further subsets of recipients 502, 504 based on identified secondary sharing preferences. For example, of the subset of recipients 406 (e.g., 2,000 recipients) that prefer to share educational content via the first social network, a subset of recipients 502 (e.g., 1,000 recipients) may have Email as a second most preferred channel for sharing. A subset of recipients 504 (e.g., 1,000) recipients may have a second social network (labeled "SN2" in FIG. 5) as a second most preferred channel for sharing.

The server system 102 can provide the information identifying each subset of recipients 406-420 to the marketer system 116. The marketing application 112 can indicate, through a user interlace display, the identified sharing preferences and the number of recipients that prefer to share using each sharing preference. A marketer can select one or more subsets of recipients 406-420 and design a marketing campaign based on the identified sharing preferences, thus "visually orchestrating" subsets of recipients based on identified sharing behavior of the recipients.

Figure 6:
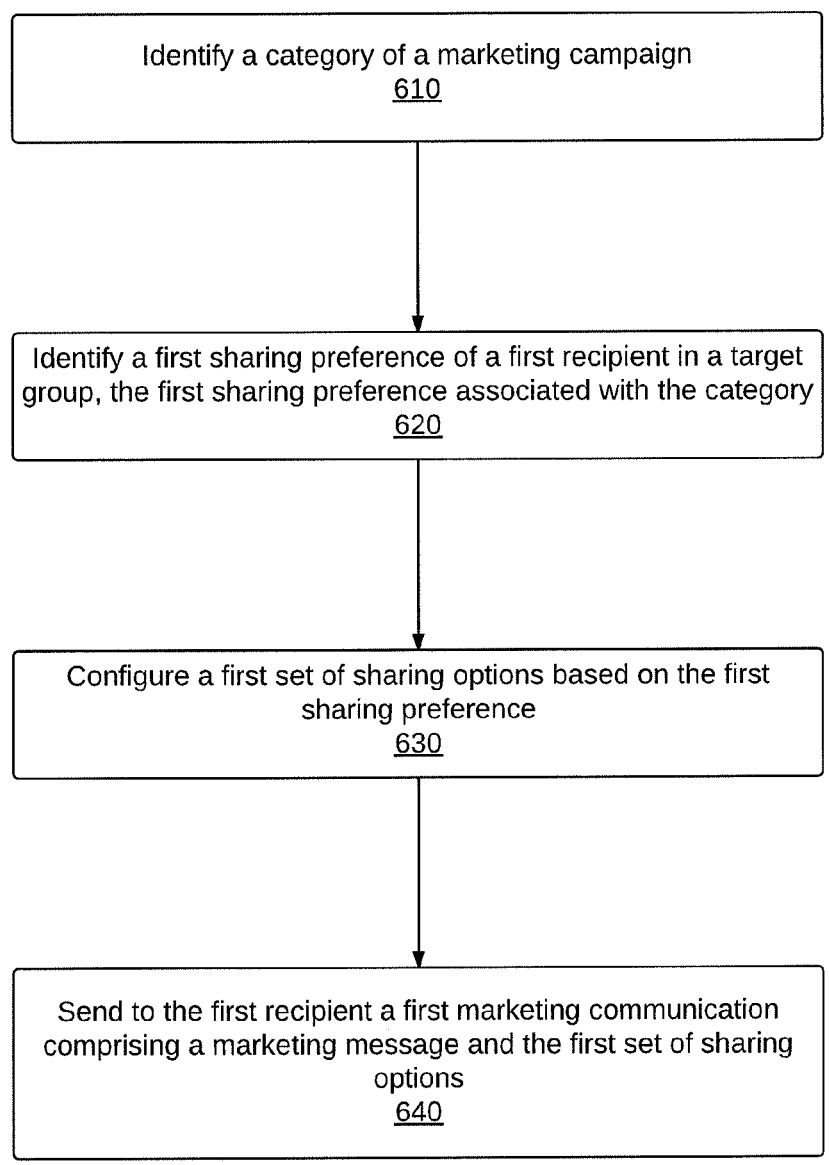
FIG. 6 is a flowchart illustrating an embodiment for a method for identifying category-specific sharing preferences and configuring marketing communications based on the identified sharing preferences.

FIG. 6 is a flowchart illustrating an exemplary method 600 for identifying category-specific sharing preferences and configuring marketing communications based on the identified sharing preferences. The method 600 may be performed by one or more of the components illustrated in FIG. 1 or by any other suitable component or in any suitable computing and/or communication environment.

The method 600 involves identifying a category of a marketing communication, as shown in block 610. This can be performed in a variety of ways. For example, for a new campaign initiated by a marketer, the server system 102 can determine the category of the campaign 'C' by a category identification module 104, which can analyze the campaign's content. This can be done as mentioned above by using Adobe SEDONA 3.0.5.3 software, the Semantria API, or by any other application or service capable of inferring categories from text or other content. The category of a marketing campaign can be inferred by analyzing the content of descriptive information about the campaign and/or one or more actual or potential marketing communications associated with the campaign.

The method 600 further involves identifying a first sharing preference of a first recipient in a target group, the sharing preference associated with the category, as shown in block 620. For example, the target group of recipients may include 5,000 recipients that prefer to receive the marketing communication of category 'C' via e-mail. The sharing preference identification module 106 can identify a first sharing preference for a first recipient in the target group and a second sharing preference for a second recipient in the target group, the first sharing preference and second sharing preference different from each other. For example, one recipient in the target group may prefer to share marketing communications of category 'C' via a first social network, and a second recipient in the target group may choose to share marketing communications of category 'C' via a second social network. In some aspects, the server system 102 can also identify the second most preferred channel of sharing for each recipient. In this manner, the sharing preference identification module 106 can identify a sharing preference for a subset of recipients (e.g., 3,000 recipients of the 5,000 recipients of the target group).

In one embodiment, the sharing preference for each recipient of the target group of recipients can be determined based on previous interactions of the recipients on a prior marketing communication of category 'C.' For example, the server system 102 can include a memory that stores a customer profile for each recipient among the target group of recipients. The server system 102 can track whether each recipient of a prior marketing communication shared the received content, and if the recipient did share the content, which channel of communication was used to share the content. One method of tracking recipient interactions with marketing communication is monitoring tracking by redirection of links. For example, each sharing option can be provided in a marketing communication as a hyperlink that links to the server system 102, (e.g., a tracking server). The server system 102 can then link to the selected channel of sharing. By linking a sharing option to first the server system 102 before linking to the channel of sharing, the system server 102 can monitor which channel of sharing is selected by the recipients. Thus, for each recipient, the channel of communication used to share prior marketing content of category 'C' can be stored in the recipient's customer profile. In a subsequent marketing communication of category 'C,' the server system 102 can identify sharing preferences for each recipient based on the information stored in the respective customer profiles.

Based on the identified sharing preferences for each recipient in the target group of recipients, the server system 102 can configure a first set of sharing options, as shown in block 630. For example, a set of sharing options in a marketing communication can include hyperlinks or image icons to access various channels of sharing. A set of sharing options can include selectable icons depicting different social networks, the selectable icons linking to the respective social network platform. The set of sharing options can also include an application link to open the recipient's e-mail client with a message sharing the content. A set of sharing options can also be embedded within the marketing communication, the embedded sharing options revealed when the recipient highlights or otherwise selects a portion of the marketing communication.

The content configuration module 108 can configure the set of sharing options in various ways. For example, the content configuration module 108 can configure the set of sharing options by increasing the visibility of the identified preferred sharing preference (e.g., by making the preferred sharing icon more prominent relative to the other sharing icon). As another example, the content configuration module 108 can position the set of sharing options in an order that is based on the identified primary sharing preference and the secondary sharing preference. For instance, if a recipient's identified primary sharing preference is a first social network and secondary sharing preference is a second social network, then the icons representing the first social network and the second social network are ordered, respectively, in the set of sharing options included in the marketing communication. The content configuration module 108 can also configure the set of sharing options by reducing the number of sharing icons, such that the recipient is provided only the preferred sharing options in the marketing communication. The content configuration module 108 can also Include a textual note alongside the preferred sharing option reminding the recipient that he or she previously shared similar marketing communications of category 'C' with his or her contacts.

The content configuration module 108 can similarly customize a different set of sharing options for each recipient in the target group of recipients. The content configuration module 108 can configure a second set of sharing options for a second recipient in the target group based-on the second recipient's sharing preferences identified in block 620. For example, if the first recipient's sharing preference is e-mail and the second recipient's sharing preference is a particular social network, then the content configuration module 108 can customize a first set of sharing options for the first recipient and a second set of sharing options for the second recipient. The first set of sharing options, in this example, would be customized such that the visibility of a selectable "e-mail" link would be increased relative to the other sharing options. Similarly, the second set of sharing options would be customized such that the visibility of the preferred social network icon would be increased relative to the other sharing options.

The method 600 further involves sending to the first recipient a first marketing communication comprising a marketing message and the first set of sharing options, as shown in block 640. The first set of sharing options is configured to account for sharing preferences specific to the first recipient. The marketing message can include the content of the marketing communication specific to the category identified in block 610. The outbound communication module 110 in the server system 102 can transmit the marketing communication to the target recipient device 118 for the first recipient. Similarly, the outbound communication module 110 can transmit a marketing communication with a common marketing message and a customized set of sharing options for each recipient in the target group.

Figure 7:
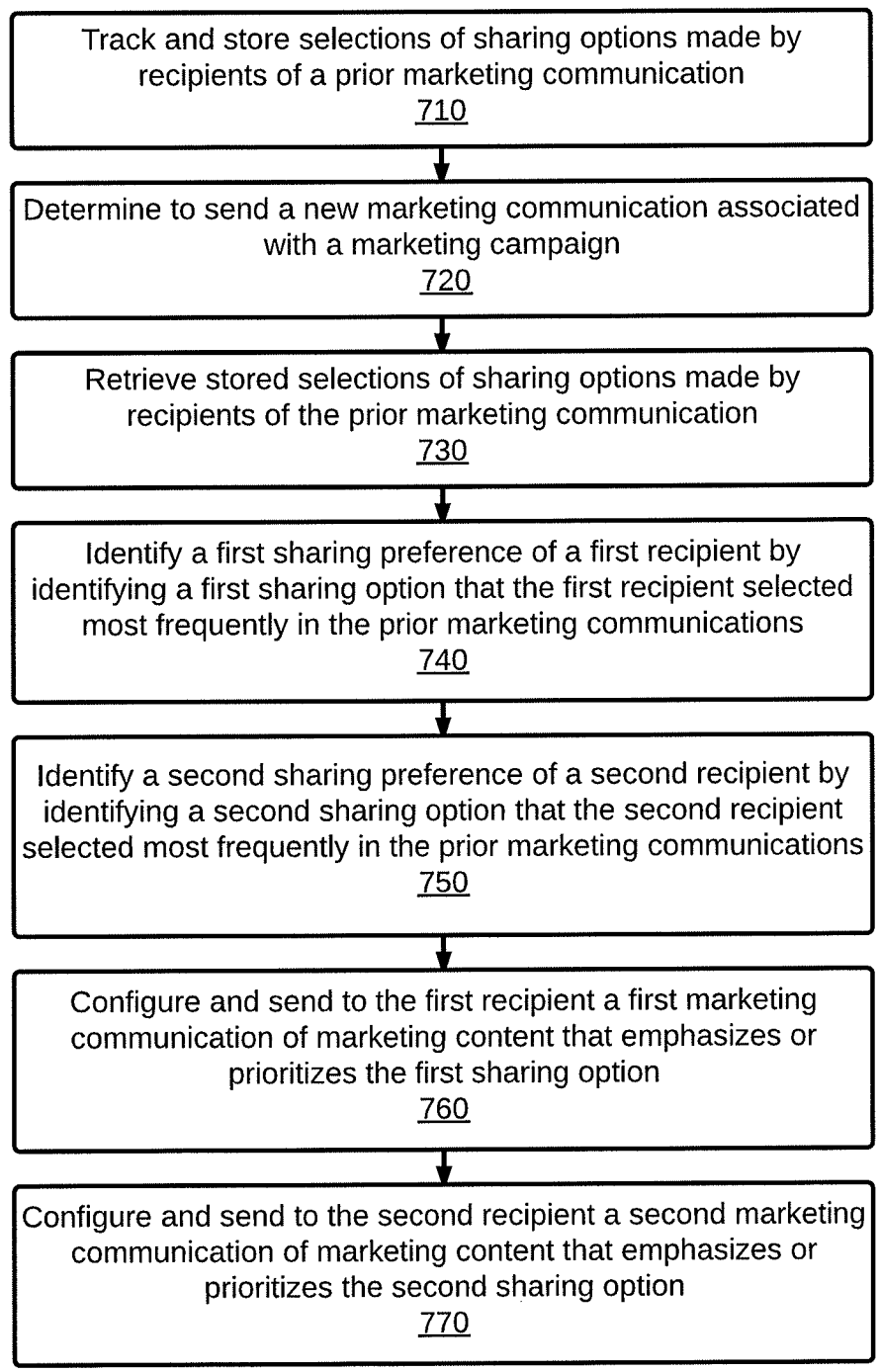
FIG. 7 is a flowchart illustrating an additional embodiment for identifying sharing preferences for a first recipient and a second recipient and configuring marketing communications to the first recipient and second recipient based on the identified sharing preferences.

FIG. 7 is a flowchart depicting an example method 700 with additional details for identifying sharing preferences and separately customizing sharing options for a first recipient and a second recipient based on the identified sharing preferences. The method 700 may be performed by one or more of the components in FIG. 1 or by any other suitable component or in any suitable computing and/or communication environment.

The method 700 involves tracking and storing selections of sharing options made by recipients of a marketing communication, as shown in block 710. For example, after sending a marketing communication to recipient device(s) 118, the server system 102 can continue to track how the recipients interact with the received marketing communication. As mentioned above with respect to FIG. 6, the server system 102 can track whether each recipient received the content, whether each recipient shared the content, and which channel of communication was used to share the content. For example, if two recipients received a marketing communication regarding an advertisement for a new car (e.g., falling under as "automotive" category), the first recipient may choose to share the advertisement on a first social media network and the second recipient may choose to share the advertisement on a second social media network. The server system 102 can track how each recipient interacted with the marketing communication by redirection of links, as explained above with respect to FIG. 6. The server system 102 then stores information indicating the first recipient's preference to share automobile related marketing communication using a first social network in a customer profile for the first recipient. Similarly, the server system 102 stores information indicating the second recipient's preference to share automobile related marketing communication using a second social network in a customer profile for the second recipient. The customer profiles can be stored in a memory within the server system 102 or a remote memory device connected via a network to the server system 102.

Each time a marketing communication is transmitted to recipients, the server system 102 can track recipient interactions with the marketing communication and update each recipient's customer profile to store information indicating the number of times recipients share marketing content of the given category. For example, as part of the marketing campaign, the server system 102 can transmit numerous marketing communications (e.g., advertisements) to the first recipient and second recipient, each marketing communication pertaining to automobile marketing. The server system 102 can track recipient interactions on each of the marketing communications and update the customer profiles as each recipient interacts with the content. Thus, a stored customer profile can include historical data indicating how many times the recipient shared content of a given category for each sharing option. The server system 102 can thus track, for each recipient, the sharing option most frequently selected, the sharing option second most frequently selected, etc.

At a subsequent point in time, the marketer system 116 can determine to send a new marketing communication associated with the same marketing campaign, as shown in block 720. For example, the marketer system 116 can determine to send an additional advertisement advertising a second automobile to a group of recipients including the first recipient and the second recipient. The marketer system 116 can design the new marketing communication via the marketing application 112 and provide the new marketing communication to the server system 102.

In response to receiving the new marketing communication from the marketer system 116, after identifying the category of the new marketing communication, the server system 102 retrieves stored selections of sharing options made by the recipients of the prior marketing communication as shown in block 730. The server system 102 searches through the stored database in memory for the customer profiles associated with the intended recipient of the new marketing communication. For example, the server system 102 retrieves the customer profile associated with the first recipient and the second recipient referred to above with respect to block 710. The retrieved customer profiles include the stored selections of sharing options the first recipient and the second recipient selected when interacting with the prior automobile related marketing communication. The retrieved customer profiles also include the amount of times recipients shared prior marketing communications of the automobile category.

From the retrieved customer profiles (and accordingly the retrieved selections of sharing options), the server system 102 identifies sharing preferences for each of the intended recipients of the new marketing communication. In block 740, the server system 102 identifies a first sharing preference of a first recipient by identifying a first sharing option that the first recipient selected most frequently in the prior marketing communication. For example, the server system 102 can identify that the first recipient most frequently shared prior automobile advertisements via a first social network. The server system 102 then associates the first recipient's sharing preference as sharing via a first social network. Similarly, in block 750, the server system 102 identifies a sharing preference of a second recipient by identifying a second sharing option that the second recipient selected most frequently in the prior marketing communications. For example, the customer profile of the second recipient can indicate that the second recipient most frequently shared prior automobile advertisements via a second social network. Accordingly, the server system 102 associates the second recipient's sharing preference as sharing via a second social network.

Based on the identified sharing preferences, the server system 102 can configure and send the new marketing communication to the intended recipients with customized sharing options for each intended recipient. In block 760, the server system 102 configures and sends to the first recipient a first marketing communication 200 of marketing content that emphasizes or prioritizes the first sharing option. For example, the first marketing communication includes a marketing message 202 and a set of sharing options 202a-d customized based on the first sharing preference. As the first sharing preference identified in this example is sharing via a first social network, the server system 102 configures the set of sharing options 202a-d to emphasize a user interface icon or hyperlink representing the first sharing option. For example, referring to FIG. 2, the server system 102 can increase the size of an icon referring to the first social network, such as sharing option 204a. As explained above, however, sharing options can be configured in various ways. The server system 102 can then send the new marketing communication 200, with customized sharing options, to the first recipient.

In block 770, the server system 102 configures and sends to the second recipient a second marketing communication 300 of marketing content that emphasizes or prioritizes the second sharing option. For example, the second marketing communication 300 includes the marketing message 202 and the set of sharing options 204c-d, 304 customized based on the second sharing preference. As the second sharing preference identified in this example is sharing via a second social network, the server system 102 customizes the sharing options 204c-d, 304 to emphasize the user interface icon or hyperlink representing the second social network (e.g., by increasing the size of the sharing option 204c). The server system 102 can then send the new marketing communication 300, with customized sharing options, to the second recipient. Following the process 700, the server system 102 can thus send a marketing communication containing the same marketing message (e.g., an advertisement for an automobile) but containing individualized and customized sharing options for each recipient.

Figure 8:
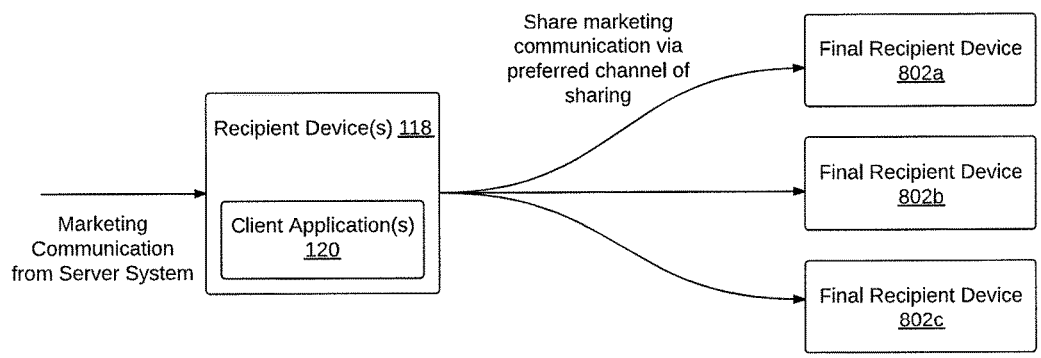
FIG. 8 is a block diagram depicting an example of a recipient device sharing a marketing communication to final recipient devices.

Once the marketing communication is received by the recipient device(s) 118, the recipients can share the marketing communication with their contacts via one or more of the sharing options included in the marketing communication. FIG. 8 is a block diagram depicting an example of a recipient device 118 sharing a received marketing communication to final recipient devices 802a-c via one or more channels of sharing. For example, the recipient device 118 can share the marketing communication via a preferred social network. Final recipient devices 802a-c, upon accessing the social network platform, may select the shared marketing communication. However, in some instances, the final recipients 802a-c may or may not select or otherwise view the shared content.

Figure 9:
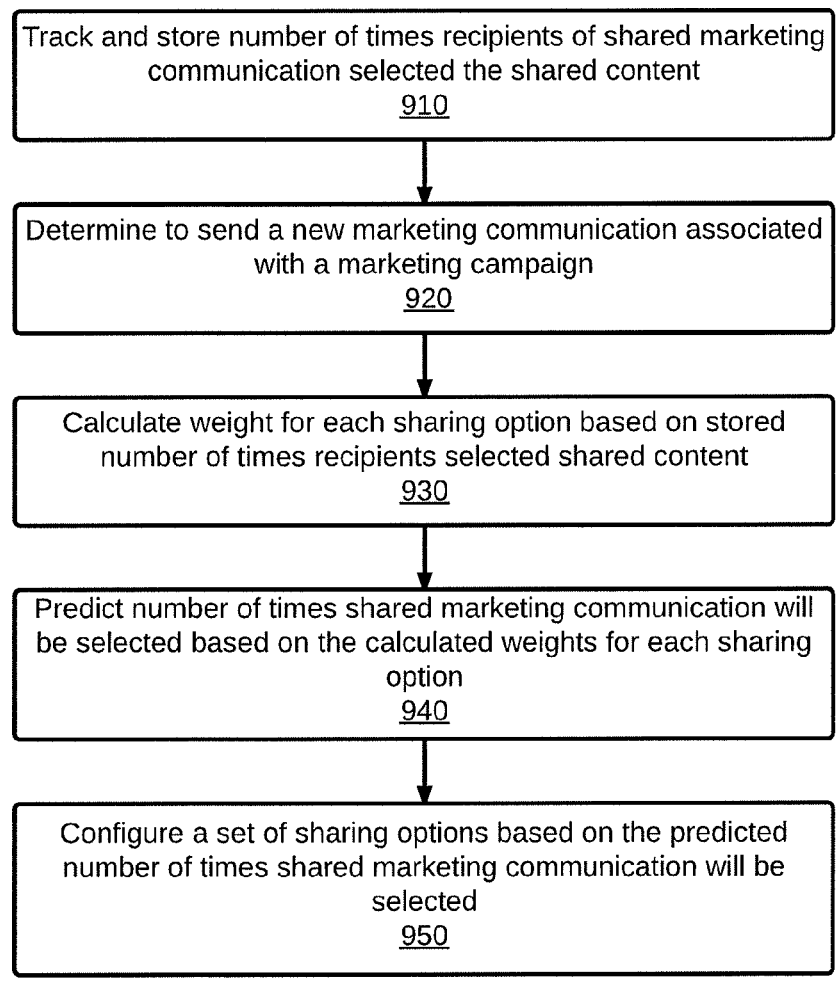
FIG. 9 is a flowchart illustrating an example process for configuring sharing options based on a predicted number of times a shared marketing communication will be selected by final recipients of a shored marketing communication.

Aspects described herein allow the server system 102 to further customize a set of sharing options in a subsequent marketing communication based on the predicted number of times final recipients 802a-c of shared marketing communications would select, access, or otherwise open the shared content. FIG. 9 is a flowchart depicting an example method 900 for customizing sharing options based on the predicted number of times final recipients 802a-c will select shared marketing communication. The method 900 may be performed by one or more of the components in FIG. 1 or by any other suitable component or in any suitable computing and/or communication environment.

The method 900 involves tracking and storing the number of times final recipients of a prior shared marketing communication of a given category 'C' selected the shared content, as shown in block 910. The server system 102 can track how many times a shared marketing communication is selected by the final recipients 802a-c for each channel of sharing. One method of tracking selections of the shared marketing communication by the final recipients 802a-c is by monitoring final recipient selections by redirection of links, described above with respect to block 620. For example, the shared marketing communication can include a link that directs the final recipient 802 back to the server system 102, which can monitor how many recipients selected/viewed the marketing communication and which channel of sharing was used to access the marketing communication.

In block 920, the marketer system 116 can determine to send a new marketing communication associated with a marketing campaign. The subsequent marketing communication can include content of the same category 'C' as the earlier marketing communication provided to recipient device(s) 118 and shared to final recipients 802a-c in block 910.

Based on the tracked and stored number of times final recipients 802a-c selected the prior shared marketing communication, the server system 102 can calculate a weight for each sharing option, as shown in block 930. The weight corresponds to the "resulting number of selections" to "number of shares" ratio. A "selection" of a marketing communication refers to a final recipient 802 selecting, accessing, viewing, or otherwise showing interest in the shared marketing communication. As an example, for the given category 'C' every five shares on a first social network can result in one selection by a final recipient of the shared marketing communication. The corresponding weight for the first social network is then $1/5=0.2$. For the same marketing communication, every four shares on a second social network can result in three selections by the final recipients 802a-c of the shared marketing communication. The corresponding weight for the second social network is then ¾=0.75. If, for a particular communication channel, every one share generates two selections, then the weight will be 2/1=2.

Using the calculated weights for each sharing option, the server system 102 can predict the number of times a subsequent shared marketing communication will be selected by final recipients 802a-c, as shown, in block 940. The server system 102 can apply the calculated weights to each sharing option in order to predict the total number of selections that will be made by final recipients 802a-c. In some instances, the sharing option that has the highest number of predicted selections may be different than the identified preferred sharing option. To predict the number of times a subsequent marketing communication will be selected by final recipients 802a-c, the server system 102 multiplies the number of times a prior marketing communication was shared by the calculated weight for the respective channel of sharing. For example, for a subset of recipients that prefer a first social network as the channel for sharing, the server system 102 may track that the subset of recipients shared a prior marketing communication 500 times on the first social network and 400 times on a second social network. Using the weights calculated above, the computer-implemented system can then predict that for every 500 shares on the first social network, final recipients 802a-c will select or otherwise access the content 500× 0.2=100 number of times. Similarly, the computer-implemented system can predict that for every 400 shares on the second social network, final recipients 802a-c will select or otherwise access the content 400×0.75=300 times.

Based on the predicted number of times the shared marketing communication will be selected by final recipients 80a-c, the content configuration module 108 can configure the set of sharing options in the subsequent marketing communication, as shown block 950. For example, the content configuration module 108 can configure the set of sharing options to emphasize the second social network as the prominent sharing option, even though the subset of recipients indicated the first social network as the preferred channel for sharing. The content configuration module 108 can customize the set of sharing options in the manner described above with respect to block 630 of FIG. 6.

Figure 10:
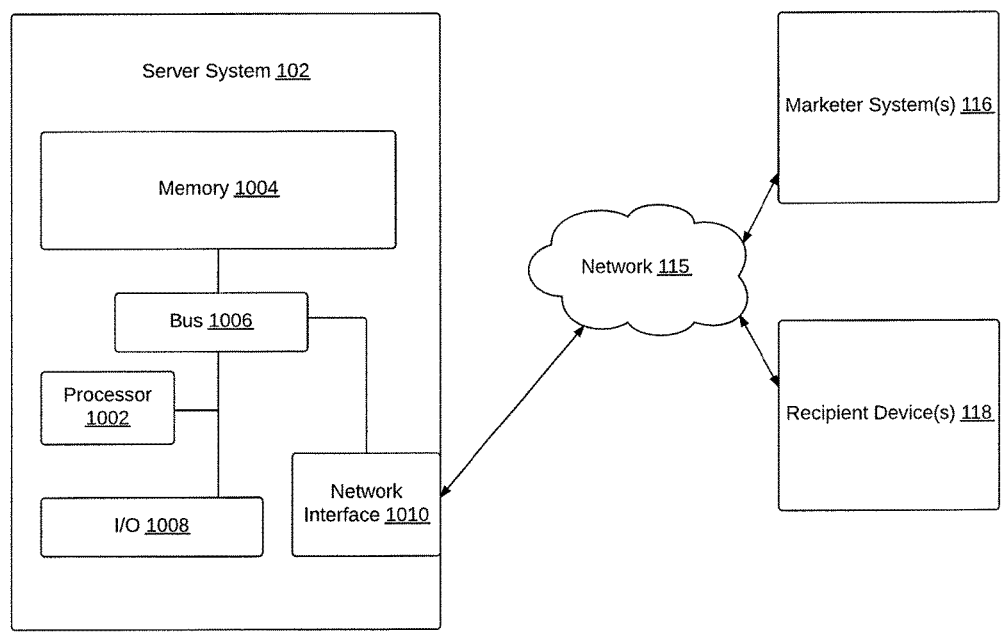
FIG. 10 is a block diagram depicting example hardware implementations for the components described in FIG. 1.

Any suitable computing system or group of computing systems can be used to implement the marketer system(s) 116, recipient device(s) 118, and server system 102. For example, FIG. 10 is a block diagram depicting examples of implementations of such components. The server system 102 can include a processor 1002 that is communicatively coupled to a memory 1004 and that executes computer-executable program code and/or accesses information stored in the memory 1004. The processor 1002 may comprise a microprocessor, an application-specific integrated circuit ("ASIC"), a state machine, or other processing device. The processor 1002 can include one processing device or more than one processing device. Such a processor can include or may be in communication with a computer-readable medium storing instructions that, when executed by the processor 1002, cause the processor to perform the operations described herein.

The memory 1004 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 102 may also comprise a number of external or internal devices such as input or output devices. For example, the server system 102 is shown with an input/output ("I/O") Interface 1008 that can receive input from input devices or provide output to output devices. A bus 1006 can also be included in the server system 102. The bus 1006 can communicatively couple one or more components of the server system 102.

The server system 102 can execute program code that configures the processor 1002 to perform one or more of the operations described above. The program code can include one or more of the category identification module 104, sharing preference identification module 106, content configuration module 108, or outbound communication module 110. The program code may be resident in the memory 1004 or any suitable computer-readable medium and may be executed by the processor 1002 or any other suitable processor. In some embodiments, modules can be resident in the memory 1004, as depicted in FIG. 10. In additional or alternative embodiments, one or more modules can be resident in a memory that is accessible via a data network, such as a memory accessible to a cloud service.

The server system 102 can also include at least one network interface device 1010. The network interface device 1010 can include any device or group of devices suitable for establishing a wired or wireless data connection to one or more data networks 115. Non-limiting examples of the network interface device 1010 include an Ethernet network adapter, a modem, and/or the like. The server system 102 can transmit messages as electronic or optical signals via the network interface device 1010.

The marketing system(s) 116 and recipient device(s) 118 can similarly each include a processor that is communicatively coupled to a memory and that executes computer-executable program code and/or accesses information stored in the memory and otherwise include similar computing components as described with respect to server system 102.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject mutter.

Unless specifically stated otherwise, it is appreciated that throughout this specification discussions utilizing terms such as "processing," "computing" "calculating." "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for sending marketing communications with sharing options configured based on category-specific sharing preferences of target recipients, the method comprising:
    receiving, at a computing device, a marketing communication of a marketing campaign and identifying a category of the marketing campaign;
    retrieving, by the computing device from a database, a customer profile of a target recipient of the marketing communication, the customer profile indicating a number of shares by the target recipient of marketing communications associated with the category over a data network using each of a plurality of channels of sharing;
    determining, from the customer profile, by the computing device, a first preferred channel of sharing and a second preferred channel of sharing of the plurality of channels of sharing, the first preferred channel of sharing having the greatest of the number of shares and the second preferred channel of sharing having the second greatest of the number of shares;
    adding to the marketing communication, by the computing device, at least a first sharing option corresponding to the first preferred channel of sharing and a second sharing option corresponding to the second preferred channel of sharing, the first sharing option comprising a first selectable user interface element for initiating further sharing by the target recipient of a marketing message included in the marketing communication over the first preferred channel, and the second sharing option comprising a second selectable user interface element for initiating further sharing by the target recipient of the marketing message over the second preferred channel, wherein the first sharing option is displayed more prominently than the second sharing option;
    wherein the first selectable user interface element comprises a first embedded link directed to a tracking server device and is configured to cause the tracking server device to redirect the marketing message to a first server device associated with the first preferred channel, and wherein the second user selectable interface element comprises a second embedded link directed to the tracking server device and configured to cause the tracking server device to redirect the marketing message to a second server device associated with the second preferred channel;
    sending, by the computing device, over the data network, the marketing communication to a second computing device accessed by the target recipient, wherein a selection of one of the first sharing option or the second sharing option causes an activation applicable to one of the first embedded link or the second embedded link, which configures the second computing device to send the marketing message to the tracking server device over the data network for redirection to the applicable one of the first server device or the second server device;
    receiving, by the computing device, from the tracking server device over the data network, an indication of the selected one of the first sharing option or the second sharing option; and
    accessing, by the computing device, the database, and updating the customer profile of the target recipient to increase the number of shares for the applicable one of the first preferred channel or the second preferred channel.

2. The method of claim 1 further comprising:
    retrieving, from the database, a second customer profile of a second target recipient of an additional computing device, the second customer profile comprising a number of shares over a data network using a first channel of sharing and a number of shares over the data network using a second channel of sharing and comprising preferences of the second target recipient for further sharing marketing communications associated with the category over the data network using a third channel of sharing different from the first channel of sharing and the second channel of sharing;
    adding, by the computing device and based on the second customer profile, at least a second sharing option to the marketing communication, wherein the second sharing option comprises at least one sharing option associated with the third channel of sharing; and
    sending, by the computing device, over the data network, the marketing communication to the additional computing device accessed by the second target recipient, wherein a selection of one of the second sharing option configures the additional device to send the marketing message to a tracking server device over the data network for redirection to the applicable one of the first server device or the second server device.

3. The method of claim 1, wherein number of shares are further determined based on respective interactions by the target recipient with prior marketing communications.

4. The method of claim 1, wherein the number of shares are determined based on prior sharing behavior of the target recipient and the prior sharing behavior of the target recipient comprises interactions with prior marketing communications associated with the category.

5. The method of claim 1 further comprising:
predicting, for each of the sharing options, a number of times the marketing communication will be selected by one or more final recipients of the marketing communication.

6. The method of claim 5 further comprising configuring, for a subsequent marketing communication, the sharing option based on the predicted number of times the marketing communication will be selected.

7. A system for sending marketing communications with sharing options configured based on category-specific sharing preferences of target recipients, the system comprising:
a target computing device;
a computing device comprising a processing device; and
a memory device communicatively coupled to the processing device, wherein the processing device is configured to execute instructions included in the memory device to perform operations comprising:
receiving a marketing communication of a marketing campaign and identifying a category of the marketing campaign;
retrieving, from a database, a customer profile of a target recipient of the marketing communication, the customer profile indicating a number of shares by the target recipient of marketing communications associated with the category over a data network using each of a plurality of channels of sharing;
determining, from the customer profiles, a first preferred channel of sharing and a second preferred channel of sharing of the plurality of channels of sharing, the first preferred channel of sharing having the greatest of the number of shares by the target recipient and the second preferred channel of sharing having the second greatest of the number of shares by the target recipient;
adding, to the marketing communication, at least a first sharing option corresponding to the first preferred channel and a second sharing option corresponding to the second preferred channel, the first sharing option comprising a first selectable user interface element for initiating further sharing by the target recipient of a marketing message included in the marketing communication over the first preferred channel, and the second sharing option comprising a second selectable user interface element for initiating further sharing by the target recipient of the marketing message over the second preferred channel, wherein the first sharing option is displayed more prominently than the second sharing option;
wherein the first user interface element comprises a first embedded link directed to a tracking server device and is configured to cause the tracking server device to redirect the marketing message to a first server device associated with the first preferred channel, and wherein the second user interface element comprises a second embedded link directed to the tracking server device and configured to cause the tracking server device to redirect the marketing message to a second server device associated with the second preferred channel;
sending, over the data network, the marketing communication to the target computing device accessed by the target recipient, wherein a selection of one of the first sharing option or the second sharing option causes an activation applicable to one of the first embedded link or the second embedded link, which configures the target computing device to send the marketing message to the tracking server device over the data network for redirection to the applicable one of the first server device or the second server device;
receiving, from the tracking server device over the data network, an indication of the selected one of the first sharing option or the second sharing option; and
accessing, by the computing device, the database, and updating the customer profile of the target recipient to increase the number of shares for the applicable one of the first preferred channel or the second preferred channel,
wherein the target computing device is configured to:
receive marketing communication from the computing device;
in response to receiving a selection of the first sharing option, activate the first embedded link and send the marketing message to the tracking server device, wherein the tracking server redirects the marketing message to the first server device; and
in response to receiving a selection of the second sharing option, activate the second embedded link and send the marketing message to the tracking server device, wherein the tracking server redirects the marketing message to the second server device.

8. The system of claim 7, wherein the processing device is further configured to execute instructions to perform operations comprising:
retrieving, from the database, a second customer profile of a second target recipient of an additional computing device, the second customer profile comprising a number of shares over a data network using a first channel of sharing and a number of shares over the data network using a second channel of sharing and comprising preferences of the second target recipient for further sharing marketing communications associated with the category over the data network using a third channel of sharing different from the first channel of sharing and the second channel of sharing;
adding, based on the second customer profile, at least a second sharing option to the marketing communication, wherein the sharing option comprises at least one sharing option associated with the third channel of sharing; and
sending, over the data network, the marketing communication to the additional computing device wherein a selection of one of the second sharing option configures the additional computing device to send the marketing message to a tracking server device over the data network for redirection to the applicable one of the first server device or the second server device.

9. The system of claim 7, wherein the customer profile comprises sharing preferences determined based on prior sharing behavior of the target recipient and the prior sharing behavior of the target recipient comprises interactions with prior marketing communications associated with the category.

10. The system of claim 7, wherein the number of shares are further determined based on respective interactions by the target recipient with prior marketing communications.

11. The system of claim 7, wherein adding the sharing option to the marketing communication further comprises increasing visibility of the at least one sharing option associated with the first preferred channel.

12. The system of claim 7, wherein the processing device is further configured to execute instructions to perform operations comprising:
    predicting, for each of the sharing option, a number of times the marketing communication will be selected by one or more final recipients of the marketing communication.

13. The system of claim 12, wherein the processing device is further configured to execute instructions to perform operations comprising:
    configuring, for a subsequent marketing communication, the sharing option based on the predicted number of times the marketing communication will be selected.

14. A non-transitory computer-readable medium with program code stored thereon, wherein the program code is executable by a computing device to perform operations comprising:
    receiving, at the computing device, a marketing communication of a marketing campaign and identifying a category of the marketing campaign;
    retrieving, by the computing device from a database, a customer profile of a target recipient of the marketing communication, the customer profile indicating a number of shares by the target recipient of marketing communications associated with the category over a data network using each of a plurality of channels of sharing;
    determining, from the customer profile, by the computing device, a first preferred channel of sharing and a second preferred channel of sharing of the plurality of channels of sharing, the first preferred channel of sharing having the greatest of the number of shares and the second preferred channel of sharing having the second greatest of the number of shares;
    adding to the marketing communication, by the computing device, at least a first sharing option corresponding to the first preferred channel and a second sharing option corresponding to the second preferred channel, the first sharing option comprising a first selectable user interface element for initiating further sharing by the target recipient of a marketing message included in the marketing communication, over the first preferred channel, and the second sharing option comprising a second selectable user interface element for initiating further sharing by the target recipient of the marketing message over the second preferred channel, wherein the first sharing option is displayed more prominently than the second sharing option
    wherein the first user interface element comprises a first embedded link directed to a tracking server device and is configured to cause the tracking server device to redirect the marketing message to a first server device associated with the first preferred channel, and wherein the second user interface element comprises a second embedded link directed to the tracking server device and configured to cause the tracking server device to redirect the marketing message to a second server device associated with the second preferred channel;
    sending, by the computing device, over the data network, the marketing communication to a second computing device accessed by the target recipient, wherein a selection of one of the first sharing option or the second sharing option causes an activation applicable to one of the first embedded link or the second embedded link, which configures the second computing device to send the marketing message to the tracking server device over the data network for redirection to the applicable one of the first server device or the second server device
    receiving, by the computing device, from the tracking server device over the data network, an indication of the selected one of the first sharing option or the second sharing option; and
    accessing, by the computing device, the database, and updating the customer profile of the target recipient to increase the number of shares for the applicable one of the first preferred channel or the second preferred channel.

15. The non-transitory computer-readable medium of claim 14, wherein the program code is executable to perform operations further comprising:
    retrieving, from the database, a second customer profile of a second target recipient of an additional computing device, the second customer profile comprising a number of shares over a data network using a first channel of sharing and a number of shares over the data network using a second channel of sharing and comprising preferences of the second target recipient for further sharing marketing communications associated with the category over the data network using a third channel of sharing different from the first channel of sharing and the second channel of sharing;
    adding, by the computing device and based on the second customer profile, at least a second sharing option to the marketing communication, wherein the second sharing option comprises at least one sharing option associated with the third channel of sharing; and
    sending, by the computing device, over the data network, the marketing communication to the additional computing device accessed by the second target recipient, wherein a selection of one of the second sharing options configures the additional device to send the marketing message to a tracking server device over the data network for redirection to the applicable one of the first server device or the second server device.

16. The non-transitory computer-readable medium of claim 14, further comprising identifying prior sharing behavior of the target recipient comprising interactions with prior marketing communications associated with the category.

17. The non-transitory computer-readable medium of claim 14, further comprising identifying sharing preferences based on respective interactions by the target recipient with prior marketing communications.

18. The non-transitory computer-readable medium of claim 14, wherein adding the sharing option to the marketing campaign further comprises increasing visibility of the at least one sharing option associated with the first preferred channel.

19. The non-transitory computer-readable medium of claim 14, wherein the program code is executable to perform operations further comprising:
    predicting, for each of the sharing options, a number of times the marketing communication will be selected by one or more final recipients of the marketing communication; and
    configuring, for a subsequent marketing communication, the sharing option based on the predicted number of times the marketing communication will be selected.

* * * * *